US009672551B2

(12) United States Patent
Pate et al.

(10) Patent No.: US 9,672,551 B2
(45) Date of Patent: *Jun. 6, 2017

(54) SYSTEM AND METHOD FOR MANAGING SHARED COLLECTIONS

(71) Applicant: eBay Inc., San Jose, CA (US)

(72) Inventors: Kenneth Allen Pate, San Jose, CA (US); Robert Chatwani, Fremont, CA (US); Nancy Dickenson, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,074

(22) Filed: Jan. 28, 2015

(65) Prior Publication Data

US 2015/0142601 A1 May 21, 2015

Related U.S. Application Data

(63) Continuation of application No. 11/523,991, filed on Sep. 20, 2006, now Pat. No. 8,977,603.

(Continued)

(51) Int. Cl.
*G06F 17/30* (2006.01)
*G06Q 30/06* (2012.01)
*G06Q 30/02* (2012.01)

(52) U.S. Cl.
CPC ......... *G06Q 30/0621* (2013.01); *G06Q 30/02* (2013.01); *G06Q 30/0627* (2013.01)

(58) Field of Classification Search
CPC .............. G06F 9/465; G06F 17/30873; G06F 2216/15; G06F 9/5088; G06F 17/30864;

(Continued)

(56) References Cited

U.S. PATENT DOCUMENTS

| 5,537,586 A | 7/1996 | Amram et al. |
| 5,950,173 A | 9/1999 | Perkowski |

(Continued)

FOREIGN PATENT DOCUMENTS

| WO | WO-02054292 A2 | 7/2002 |
| WO | WO-02054292 A3 | 7/2002 |

(Continued)

OTHER PUBLICATIONS

"U.S. Appl. No. 11/426,993, Final Office Action mailed Jun. 30, 2015", 8 pgs.

(Continued)

*Primary Examiner* — Angelica Ruiz
(74) *Attorney, Agent, or Firm* — Schwegman, Lundberg & Woessner, P.A.

(57) ABSTRACT

Systems and methods for managing shared collections are described. For example, a machine receives a textual description of an entry requested to be created within a collection at a network-based system. The textual description is submitted by a user of the network-based system and received from a client device of the user by a server system within the network-based system. The entry, when created, corresponds to an item listed by the network-based system. The machine generates a structured description of the entry based on the textual description of the entry requested to be created. The structured description of the entry includes a name-value pair derived from the textual description submitted by the user. The machine determines that the entry is absent from the network-based system, and creates the entry within the collection by storing the structured description of the entry in a database of the network-based system.

20 Claims, 12 Drawing Sheets

Related U.S. Application Data

(60) Provisional application No. 60/739,723, filed on Nov. 22, 2005, provisional application No. 60/739,195, filed on Nov. 23, 2005.

(58) Field of Classification Search
CPC .. G06F 9/542; G06F 17/30902; G06F 17/308; G06F 17/3087
See application file for complete search history.

(56) References Cited

U.S. PATENT DOCUMENTS

| | | | |
|---|---|---|---|
| 6,083,276 | A | 7/2000 | Davidson et al. |
| 6,345,315 | B1 | 2/2002 | Mishra |
| 6,351,755 | B1 | 2/2002 | Najork et al. |
| 6,453,339 | B1 | 9/2002 | Schultz et al. |
| 6,470,383 | B1 | 10/2002 | Leshem et al. |
| 6,549,935 | B1 | 4/2003 | Lapstun et al. |
| 6,574,609 | B1 | 6/2003 | Downs et al. |
| 6,587,837 | B1 | 7/2003 | Spagna et al. |
| 6,611,812 | B2 | 8/2003 | Hurtado et al. |
| 6,641,037 | B2 | 11/2003 | Williams |
| 6,732,088 | B1 | 5/2004 | Glance |
| 6,892,193 | B2 | 5/2005 | Bolle et al. |
| 6,904,410 | B1 | 6/2005 | Weiss et al. |
| 6,948,120 | B1 | 9/2005 | Delgobbo et al. |
| 6,963,867 | B2 | 11/2005 | Ford et al. |
| 6,976,053 | B1 | 12/2005 | Tripp et al. |
| 7,225,199 | B1 | 5/2007 | Green et al. |
| 7,395,502 | B2 | 7/2008 | Gibbons, Jr. et al. |
| 7,447,646 | B1 | 11/2008 | Agarwal et al. |
| 8,977,603 | B2 | 3/2015 | Pate et al. |
| 2001/0032163 | A1 | 10/2001 | Fertik et al. |
| 2001/0037251 | A1 | 11/2001 | Nojima et al. |
| 2002/0016839 | A1 | 2/2002 | Smith et al. |
| 2002/0040359 | A1 | 4/2002 | Green et al. |
| 2002/0082953 | A1 | 6/2002 | Batham et al. |
| 2002/0103789 | A1 | 8/2002 | Turnbull et al. |
| 2002/0107861 | A1 | 8/2002 | Clendinning et al. |
| 2002/0120554 | A1 | 8/2002 | Vega |
| 2002/0120619 | A1 | 8/2002 | Marso et al. |
| 2002/0156688 | A1 | 10/2002 | Horn et al. |
| 2002/0194081 | A1 | 12/2002 | Perkowski |
| 2003/0018652 | A1 | 1/2003 | Heckerman et al. |
| 2003/0055806 | A1 | 3/2003 | Wong et al. |
| 2003/0154044 | A1 | 8/2003 | Lundstedt et al. |
| 2003/0167213 | A1* | 9/2003 | Jammes ............... G06F 17/3089 705/26.62 |
| 2003/0172357 | A1 | 9/2003 | Kao et al. |
| 2003/0182310 | A1 | 9/2003 | Charnock et al. |
| 2003/0217052 | A1 | 11/2003 | Rubenczyk et al. |
| 2003/0233350 | A1 | 12/2003 | Dedhia et al. |
| 2004/0006602 | A1 | 1/2004 | Bess et al. |
| 2004/0139059 | A1 | 7/2004 | Conroy et al. |
| 2004/0148611 | A1 | 7/2004 | Manion et al. |
| 2004/0177319 | A1 | 9/2004 | Horn |
| 2004/0210479 | A1 | 10/2004 | Perkowski et al. |
| 2004/0243485 | A1 | 12/2004 | Borenstein et al. |
| 2004/0249794 | A1 | 12/2004 | Nelson et al. |
| 2004/0254950 | A1 | 12/2004 | Musgrove et al. |
| 2004/0260621 | A1 | 12/2004 | Foster et al. |
| 2005/0028083 | A1 | 2/2005 | Kircher et al. |
| 2005/0102297 | A1* | 5/2005 | Lloyd ............... G06F 17/30067 |
| 2005/0171627 | A1* | 8/2005 | Funk .................. G05B 19/4065 700/121 |
| 2005/0201562 | A1 | 9/2005 | Becker et al. |
| 2005/0251409 | A1 | 11/2005 | Johnson et al. |
| 2005/0289039 | A1 | 12/2005 | Greak |
| 2005/0289105 | A1 | 12/2005 | Cosic et al. |
| 2005/0289168 | A1 | 12/2005 | Green et al. |
| 2006/0106683 | A1 | 5/2006 | Fisher et al. |
| 2006/0106859 | A1 | 5/2006 | Eugene et al. |
| 2006/0143158 | A1 | 6/2006 | Ruhl et al. |
| 2007/0118441 | A1 | 5/2007 | Chatwani et al. |
| 2007/0130207 | A1 | 6/2007 | Pate et al. |
| 2007/0150365 | A1 | 6/2007 | Bolivar |
| 2007/0260495 | A1 | 11/2007 | Mace et al. |
| 2008/0059331 | A1 | 3/2008 | Schwab |
| 2012/0265744 | A1 | 10/2012 | Berkowitz et al. |

FOREIGN PATENT DOCUMENTS

| | | | |
|---|---|---|---|
| WO | WO-2007061975 | A2 | 5/2007 |
| WO | WO-2007061975 | A3 | 5/2007 |
| WO | WO-2007078560 | A2 | 7/2007 |
| WO | WO-2007078560 | A3 | 7/2007 |

OTHER PUBLICATIONS

"U.S. Appl. No. 11/426,993, Advisory Action mailed Feb. 12, 2014", 3 pgs.

"U.S. Appl. No. 11/426,993, Final Office Action mailed Jul. 22, 2010", 17 pgs.

"U.S. Appl. No. 11/426,993, Final Office Action mailed Sep. 4, 2013", 14 pgs.

"U.S. Appl. No. 11/426,993, Final Office Action mailed Sep. 16, 2011", 16 pgs.

"U.S. Appl. No. 11/426,993, Final Office Action mailed Nov. 7, 2012", 14 pgs.

"U.S. Appl. No. 11/426,993, Non Final Office Action mailed Feb. 24, 2010", 22 pgs.

"U.S. Appl. No. 11/426,993, Non Final Office Action mailed Mar. 29, 2013", 15 pgs.

"U.S. Appl. No. 11/426,993, Non Final Office Action mailed May 23, 2014", 19 pgs.

"U.S. Appl. No. 11/426,993, Non Final Office Action mailed Jun. 21, 2012", 17 pgs.

"U.S. Appl. No. 11/426,993, Non Final Office Action mailed Dec. 15, 2014", 6 pgs.

"U.S. Appl. No. 11/426,993, Non Final Office Action mailed Dec. 23, 2010", 18 pgs.

"U.S. Appl. No. 11/426,993, Response filed Jan. 7, 2010 to Restriction Requirement mailed Dec. 7, 2009", 5 pgs.

"U.S. Appl. No. 11/426,993, Response filed Feb. 6, 2013 to Final Office Action mailed Nov. 7, 2012", 9 pgs.

"U.S. Appl. No. 11/426,993, Response filed Mar. 4, 2014 to Final Office Action mailed Sep. 4, 2013", 11 pgs.

"U.S. Appl. No. 11/426,993, Response filed Apr. 28, 2010 to Non Final Office Action mailed Feb. 24, 2010", 10 pgs.

"U.S. Appl. No. 11/426,993, Response filed Jun. 23, 2011 to Non Final Office Action mailed Dec. 23, 2010", 8 pgs.

"U.S. Appl. No. 11/426,993, Response filed Jun. 27, 2013 to Non Final Office Action mailed Mar. 29, 2013", 8 pgs.

"U.S. Appl. No. 11/426,993, Response filed Sep. 18, 2012 to Non Final Office Action mailed Jun. 21, 2012", 10 pgs.

"U.S. Appl. No. 11/426,993, Response filed Sep. 23, 2014 to Non Final Office Action mailed May 23, 2014", 13 pgs.

"U.S. Appl. No. 11/426,993, Response filed Oct. 15, 2010 to Final Office Action mailed Jul. 22, 2010", 43 pgs.

"U.S. Appl. No. 11/426,993, Response filed Nov. 4, 2013 to Final Office Action mailed Sep. 4, 2013", 10 pgs.

"U.S. Appl. No. 11/426,993, Response filed Dec. 15, 2011 to Final Office Action mailed Sep. 16, 2011", 9 pgs.

"U.S. Appl. No. 11/426,993, Restriction Requirement Dec. 7, 2009", 8 pgs.

"U.S. Appl. No. 11/523,991, Notice of Non-compliant Amendment mailed Dec. 8, 2009", 3 pgs.

"U.S. Appl. No. 11/523,991, Final Office Action mailed Mar. 28, 2012", 16 pgs.

"U.S. Appl. No. 11/523,991, Final Office Action mailed Apr. 27, 2009", 31 pgs.

"U.S. Appl. No. 11/523,991, Final Office Action mailed Sep. 2, 2010", 26 pgs.

"U.S. Appl. No. 11/523,991, Final Office Action mailed Oct. 10, 2013", 13 pgs.

"U.S. Appl. No. 11/523,991, Non Final Office Action mailed Mar. 14, 2014", 12 pgs.

(56) References Cited

OTHER PUBLICATIONS

"U.S. Appl. No. 11/523,991, Non Final Office Action mailed Mar. 18, 2010", 25 pgs.
"U.S. Appl. No. 11/523,991, Non Final Office Action mailed Apr. 11, 2013", 12 pgs.
"U.S. Appl. No. 11/523,991, Non Final Office Action mailed Oct. 17, 2011", 14 pgs.
"U.S. Appl. No. 11/523,991, Non Final Office Action mailed Nov. 10, 2008", 30 pgs.
"U.S. Appl. No. 11/523,991, Non Final Office Action mailed Mar. 21, 2011", 6 pgs.
"U.S. Appl. No. 11/523,991, Notice of Allowance mailed Oct. 29, 2014", 7 pgs.
"U.S. Appl. No. 11/523,991, Response filed Jan. 8, 2010 to Notice of Non Compliant mailed Dec. 8, 2009", 8 pgs.
"U.S. Appl. No. 11/523,991, Response filed Feb. 10, 2009 to Non Final Office Action mailed Nov. 10, 2008", 17 pgs.
"U.S. Appl. No. 11/523,991, Response filed May 15, 2012 to Final Office Action mailed Mar. 28, 2012", 15 pgs.
"U.S. Appl. No. 11/523,991, Response filed Jun. 3, 2011 to Non Final Office Action mailed Mar. 21, 2011", 9 pgs.
"U.S. Appl. No. 11/523,991, Response filed Jun. 16, 2014 to Non Final Office Action mailed Mar. 14, 2014", 13 pgs.
"U.S. Appl. No. 11/523,991, Response filed Jun. 18, 2010 to Non Final Office Action mailed Mar. 18, 2010", 15 pgs.
"U.S. Appl. No. 11/523,991, Response filed Jul. 11, 2013 to Non Final Office Action mailed Apr. 11, 2013", 16 pgs.
"U.S. Appl. No. 11/523,991, Response filed Sep. 10, 2009 to Final Office Action mailed Apr. 27, 2009", 19 pgs.
"U.S. Appl. No. 11/523,991, Response filed Oct. 29, 2010 to Final Office Action mailed Sep. 2, 2010", 21 pgs.
"U.S. Appl. No. 11/523,991, Response filed Dec. 15, 2011 to Non Final Office Action mailed Oct. 17, 2011", 14 pgs.
"U.S. Appl. No. 11/523,991; Response filed Jan. 7, 2014 to Final Office Action mailed Oct. 10, 2013", 15 pgs.
"International Application Serial No. PCT/US2006/044944, International Preliminary Report on Patentability mailed Jun. 5, 2008", 5 pgs.
"International Application Serial No. PCT/US2006/044944, International Search Report mailed May 10, 2007", 2 pgs.
"International Application Serial No. PCT/US2006/044944, Written Opinion mailed May 10, 2007", 3 pgs.
"U.S. Appl. No. 11/426,993, Response filed Apr. 15, 2015 to Non Final Office Action mailed Dec. 15, 2014", 21 pgs.
"U.S. Appl. No. 11/426,993, Non Final Office Action mailed Jan. 14, 2016", 8 pgs.
"U.S. Appl. No. 11/426,993, Response filed Oct. 30, 2015 to Final Office Action mailed Jun. 30, 2015", 16 pgs.
"U.S. Appl. No. 11/426,993, Final Office Action mailed Aug. 11, 2016", 9 pgs.
"U.S. Appl. No. 11/426,993, Response Filed Apr. 14, 2016 to Non Final Office Action mailed Jan. 14, 2016", 14 pgs.

\* cited by examiner

200

CREATE A COLLECTION

DESCRIBE THE COLLECTION YOU WOULD LIKE TO CREATE

202
[ 1959 TOPPS BASEBALL CARDS ]

204
[SUBMIT]

REVIEW OUR CLASSIFICATION                304

302 {
| PRODUCT TYPE  | : | BASEBALL CARDS ☒ |
| MANUFACTURER  | : | TOPPS ☒ |
| YEAR          | : | 1959 ☒ |
}

306
[SUBMIT]

LOS ANGELES DODGERS — 1202

THE FOLLOWING COLLECTIONS CONTAIN "LOS ANGELES DODGERS" COLLECTIONS WITH HIGHER COVERAGE ARE IN LARGER TYPE

COINS    HATS    BOBBLEHEADS — 1204A

BASEBALL CARDS — 1204D    BASEBALL GLOVES — 1204B

BASEBALLS

JERSEYS    T-SHIRTS    TICKETS — 1204C

BATS

SYSTEM AND METHOD FOR MANAGING SHARED COLLECTIONS

CROSS-REFERENCE TO RELATED PATENT DOCUMENTS

This patent application claims the benefit of priority, under 35 U.S.C. Section 119(e), to Chatwani et al., U.S. Provisional patent application Ser. No. 60/739,723, entitled "DYNAMICALLY EDITABLE ELECTRONIC PRODUCT CATALOGS," filed on Nov. 22, 2005 and to Chatwani et al., U.S. Provisional Patent Application Ser. No. 60/739,195, entitled "EDITABLE ELECTRONIC CATALOGS," filed on Nov. 23, 2005, the contents of which are hereby incorporated by reference herein in their entireties.

This patent application is a continuation of and claims the benefit of priority under 35 U.S.C. §120 to U.S. patent application Ser. No. 11/523,991 entitled "SYSTEM AND METHOD FOR MANAGING SHARED COLLECTIONS," filed on Sep. 20, 2006, which is hereby incorporated by reference herein in its entirety.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright © 2005-2015, eBay Inc. All Rights Reserved.

TECHNICAL FIELD

Embodiments of the inventive subject matter relate generally to the field of electronic commerce, and more specifically to methods and systems that facilitate shared collections.

BACKGROUND

More and more Internet users are realizing the ease and convenience of purchasing products and services through online catalogs, which are provided by network-based commerce systems. Catalog entries for various products and services may be presented to a user when the user computer interacts with a network-based commerce system, downloads catalog entry information, and displays the catalog entries on the computer's monitor via a user interface (e.g., one or more web pages). The user may then interact with the user interface to purchase the products and/or services.

BRIEF DESCRIPTION OF THE DRAWINGS

FIG. 2 is a collection creation page, in accordance with an example embodiment;

FIG. 3 is a collection classification review page, in accordance with an example embodiment;

FIG. 9 is a collection browse page, in accordance with an example embodiment;

FIG. 11 is a browse collection page, in accordance with an example embodiment;

FIG. 12 is a refocus page, in accordance with an example embodiment;

DETAILED DESCRIPTION

Methods and systems to generate, edit, and access catalog content in a network-based commerce system are described. In the following description, for purposes of explanation, numerous specific details are set forth in order to provide a thorough understanding of embodiments of the inventive subject matter. It will be evident, however, to one skilled in the art that embodiments of the inventive subject matter may be practiced without these specific details.

In various example embodiments, collections include one or more entries. In an embodiment, an entry includes any description, identifier, representation or information, stored digitally, which can describe a collectible item generally, and which can be stored within or accessible to a network-based commerce system. A collectible item can include, for example, a physical object (e.g., a baseball card, antique mirrors, etc.) or a digital object (e.g., electronically stored audio, video, etc.). For example, an entry can include one or more items of information in a group of information types that includes a name, a manufacturer, product physical characteristics (e.g., size, dimensions, weight, etc.), a model, a year of manufacture, and other information.

As will be described in more detail later, a catalog entry can have associated therewith, zero or more listings, each of which describe an instance. In an embodiment, an instance includes a specific item (e.g., a particular baseball card for sale by an individual). In an embodiment, a listing can include information describing an instance, in which the instance is a particular object being offered for sale. A listing can include information related to characteristics of that instance. For example, a listing can include one or more items of information in a group of information types that includes condition information for the product instance (e.g., damage, wear and tear, an indicator that the product instance is in excellent, fair or poor condition), product age, product location, shipping information, price, and other information.

In another embodiment, an instance includes a provenance code used to track aspects of the instance's history. For example, when an instance of a collectible item is introduced into a collection, it is assigned a provenance code. Later, when the instance is listed for sale, the date of the offer is recorded in a database and associated with the provenance code. If the instance sells, the date of sale may be recorded as well and associated with the provenance code. Thus, the provenance code can enable a user browsing the collection to view aspects of the instance's history, such as prices, dates of transactions, a chain of ownership, or the like.

Figure 1:
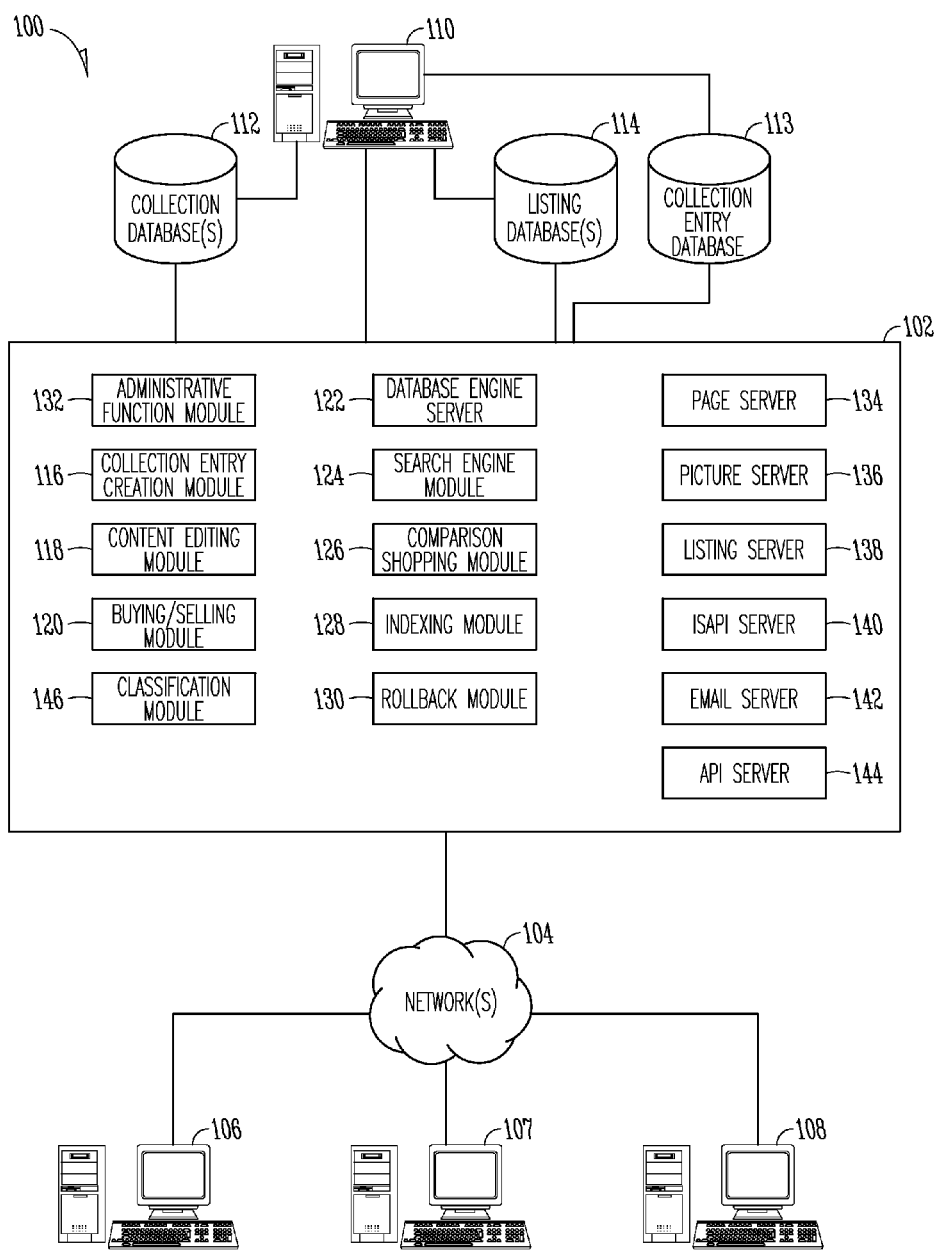
FIG. 1 illustrates a schematic block diagram of a network-based commerce system in accordance with an example embodiment.

FIG. 1 illustrates a schematic block diagram of a network-based commerce system 100 in accordance with an example embodiment of the inventive subject matter. While exemplary embodiments of the inventive subject matter are described within the context of the network-based commerce system 100, embodiments of the inventive subject matter may find application in many different types of computer-based or network-based facilities or systems. Accordingly, the example embodiment of a network-based commerce system 100 is not intended to limit the scope of the inventive subject matter solely to such systems.

In an embodiment, network-based commerce system 100 includes at least one server system 102, which can communicate over one or more networks 104 to one or more end-user computers 106-108. Server system 102 additionally can communicate over one or more direct or networked connections with one or more administration computers 110 and one or more databases 112, 113, 114.

Server system 102 can include, in various embodiments, one or more collection entry creation modules 116, content editing modules 118, buying/selling modules 120, database engine modules 122, search engine modules 124, comparison shopping modules 126, indexing modules 128, and/or classification modules 146.

In an embodiment, server system 102 includes rollback module 130, which can be used to "rollback" or revert to a previous version of a collection entry page (CEP). This is especially useful in cases of identified vandalism or mistaken edits. In an embodiment, server system 102 includes an administrative function module 132, which can provide one or more administrative functions, such as monitoring, maintaining, and managing the network-based commerce system 100. In an embodiment, administrative function module 132 can be used to lock, delete, or undelete a CEP. This functionality may be used in conjunction with a dispute resolution process, such as when a product manufacturer claims that copyrighted material is being used without authorization. For example, during a dispute, locking or deleting a CEP can result in a default CEP being used as a temporary replacement. Another function of the administrative function module 132 may be to split or combine CEP's. For example, if two users submit nearly identical CEP's describing the same collectible item, then an administrative user can use the administrative function module and lock or delete one of the "duplicate" CEP's. As another example, if a submitted CEP is too narrow, to broaden the entry, it may be prudent to split the CEP into distinct CEP's.

Server system 102 may also include one or more of a number of types of front-end servers, which may include one or more page servers 134, which may deliver web pages (e.g., mark-up language documents), one or more picture servers 136, which may dynamically deliver images to be displayed within Web pages, one or more listing servers 138, which may facilitate category-based browsing of entries and/or listings, one or more ISAPI servers 140, which may provide an interface to a back-end of the system 102, and one or more e-mail servers 142, which may provide automated e-mail communications to users of the network-based commerce system 100.

One or more API servers 144 may provide a set of API functions for querying and writing to the network-based commerce system 100. APIs may be called through the HTTP transport protocol. In an embodiment, information is sent and received using a standard XML data format. Applications utilized to interact (e.g., upload transaction listings, review transaction listings, manage transaction listings, etc.) with the network-based commerce system 100 may be designed to use the APIs. Such applications may be in an HTML form or be a CGI program written in C++, Perl, Pascal, or any other programming language.

The page servers 134, API servers 144, picture servers 136, ISAPI servers 140, search engine module 124, e-mail servers 142, and a database engine server 122 can individually, or in combination, act as a communication engine to facilitate communications between, for example, a client machine 106-108 and the network-based commerce system 100; act as a transaction engine to facilitate transactions between, for example, the client machine 106-108 and the network-based commerce system 100; and act as a display-engine to facilitate the display of entries and/or listings on, for example, the client machine 106-108.

In an embodiment, the network-based commerce system 100 is accessed by a client program, such as for example a browser (e.g., the Internet Explorer distributed by Microsoft Corp. of Redmond, Wash.) that executes on the client machine 106-108 and accesses the network-based commerce system 100 via a network 104 such as, for example, the Internet. Other examples of networks that a client may utilize to access the network-based commerce system 100 include a wide area network (WAN), a local area network (LAN), a wireless network (e.g., a cellular network), the Public Switched Telephone Network (PSTN) network, or the like. The client program that executes on the client machine 106-108 may also communicate with the network-based commerce system 100 via the API servers.

Server system 102 additionally may communicate with one or more databases (e.g., collection database 112, collection entry database 113, and listing database 114). In an embodiment, a database engine server 122 may interface with and/or maintain multiple databases. In an embodiment, a first database 112 may be maintained for collection information, a second database 113 may be maintained for collection entry information, and a third database 114 may be maintained for listing (or offering) information. The second database 113 may include licensed content and/or unlicensed content, as will be described in more detail later.

In an embodiment, collections, entries, and listings can be distinct database entities. For example, an entry can be represented by a record within a collection entry database 113 for a particular collectible item, and the entry can contain a description that is specific to the item. A listing for the item, contained in the listing database 114, can describe an actual instance of that item, such as a baseball card, that belongs to a particular individual or entity. The listing may be represented by one or more records within the listing database 114.

In an embodiment, the databases 112, 113, 114 may have a structure that can vary based on the domain (e.g., DDG, B&I, Computers, Services, etc.). The databases 112, 113, 114 can also include an entry table that contains columns to capture at least the following data: name and description. The entry table may, in a further embodiment, be enhanced to include additional data, such as one or more properties (who can edit or delete; type of entry; date of creation, date of last edit, etc.) and related data, such as ratings, reviews, stock photos, and the like.

The databases 112, 113, 114 can, in some embodiments, be implemented as relational databases, and can include a number of tables having records that are linked by indices and keys. In an embodiment, an entry identifier can be used as a key to link an entry with associated listings. In an alternative embodiment, the databases 112, 113, 114 can be implemented as collections of objects in one or more object-oriented databases. In an embodiment, databases 112, 113, 114 can include a distributed database; however, in other embodiments, databases 112, 113, 114 can include a central database.

In an embodiment, one or more databases 112, 113, 114 can include a user table that contains a record for each user of a network-based commerce system 100. A user can operate as a seller, a buyer or both, when utilizing a network-based commerce system 100. The listing database 114 also can include listings tables that may be linked to the user table. The listings tables can include a seller listings table and a buyer listings table. A user record in the user table can be linked to one or more listings that are being, or have been, listed or offered for sale via the network-based commerce system 100. In an embodiment, a link indicates whether the user is a seller or a buyer with respect to the one or more associated listings.

The collection database 112 and/or the collection entry database 113 can include one or more tables to organize and structure collection data, such as in a name table, which may contain one or more user-defined or standardized names, and a value table, which may contain one or more user-defined or standardized values. In an embodiment, the name and value tables are related in a one-to-many relationship, such as to associate one name with zero or more values. For example, a standardized name may include "Product Type," for which one or more values, such as "baseball card," "wine glass," and "lamp" is associated with using the pivot table. In another embodiment, the name and value tables are related in a many-to-many relationship, such as by using a join table. In such a configuration, the value "1984" may exist related to both a "Title" and a "Year," for example.

In an embodiment, a user at a client machine 106-108 can browse through or search online collections associated with the network-based commerce system 100. The online collections can include multiple categories such as music, books, electronics, clothing, and the like.

In an embodiment, a catalog entry can be represented on a client computer 106-108 using a collection entry page (CEP) or other visual representation. A CEP can include a generic description of a collectible item, in an embodiment. In an embodiment, a default CEP may include basic information, such as a name or model number, and be available for searches and to associate with listings of specific instances. In another embodiment, CEP's can maintain at least two views, such as a collapsed summary view and an expanded detailed view.

In an embodiment, a user can access the server system 102 and create or edit one or more collections, collection entries, or listings. In an embodiment, when a user creates or edits a collection or a collection entry, the user may provide a free-form textual description and the classification module 146 can parse and deconstruct the textual description to form structured data. An example of structured data may include name-value pairs, such as the examples shown in FIGS. 2 and 3 described below. After "structurizing" the data, the classification module 146 may communicate with the database engine server 122, the indexing module 128, or other modules, to store the structured data such that other users may reuse the data structure for other collections or collection entries.

FIG. 2 is a collection creation page 200, in accordance with an example embodiment. The collection creation page 200 allows a user to create a new collection, where the collection is to be used to group related collectibles. The collection creation page 200 includes, in an embodiment, a text input 202 and a submission control 204. Using the text input 202, a user describes the collection to create and then submits the information using the submission control 204.

FIG. 3 is a collection classification review page 300, in accordance with an example embodiment. The collection classification review page 300 includes, in an embodiment, one or more automatically generated initial classifications 302. In an embodiment, the initial classifications 302 are described using name-value pairs. The user may edit classification data, such as by editing in the text in the input control. The user may also remove irrelevant or misclassified name-value pairs, such as by clicking on the "x" 304. After the user is satisfied with the accuracy of the classification, the classification is submitted using a submission control 306. In an embodiment, upon submission the server system 102 (FIG. 1) may verify that the collection has not already been created by another user. In the case that the submitted collection is likely a duplicate, the server system 102 may provide an alert or error notification. In such a case, the submitted collection information is abandoned and the user may be directed to the pre-existing collection.

In an embodiment, as will be described in more detail below, a user can edit collection information. Editable information can include any or all of the structured data, as was classified by the classification module 146 during creation or a previous revision. In an embodiment, a user may not be able to edit some or all of the structured data related to a collection. For example, users with a higher rating, status, privilege level, or the like, may be granted edit privileges while other newer or un-experienced users may be prohibited from editing a collection. In another example, users may only be allowed to edit collections that they participate in (e.g., have one or more collectible items in the collection) or that they created.

Figure 4:
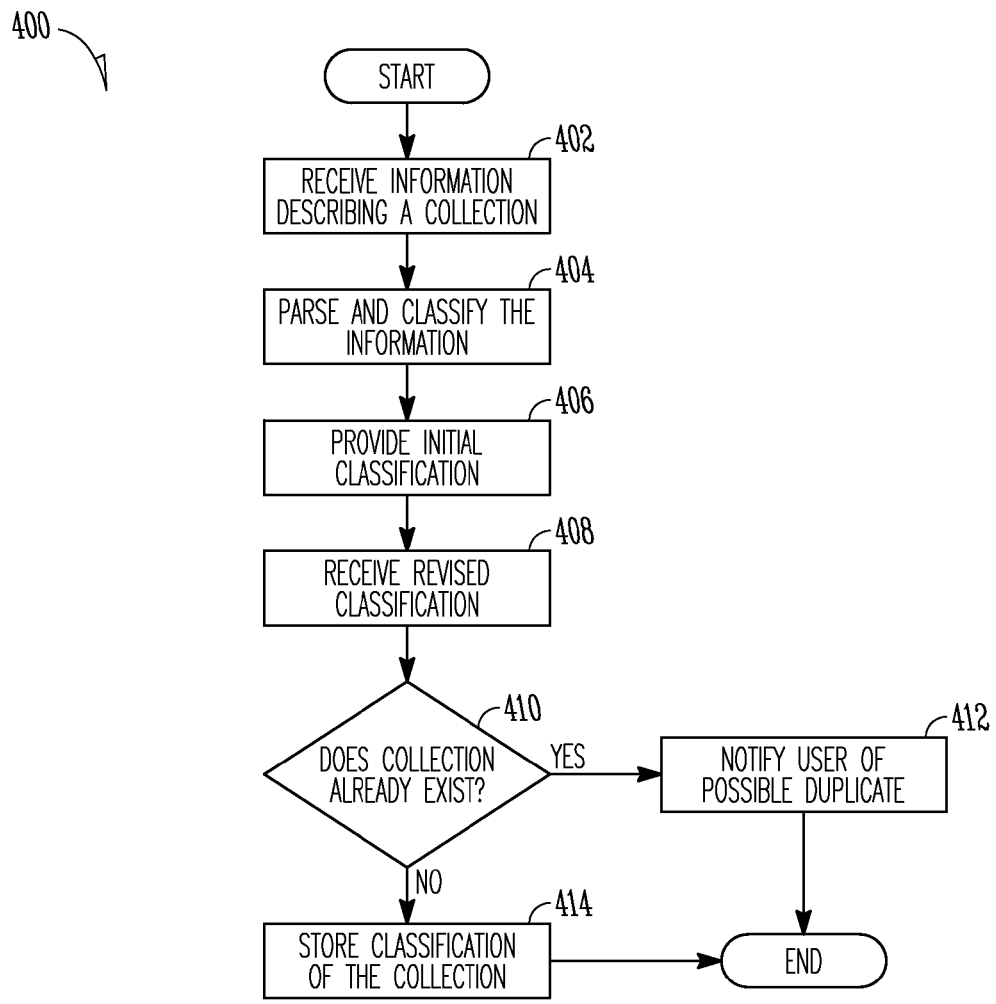
FIG. 4 is a flowchart illustrating a method of creating a collection, in accordance with an example embodiment.

FIG. 4 is a flowchart illustrating a method 400 of creating a collection, in accordance with an example embodiment. In the example embodiment, the method 400 is a computer-implemented process that is automatically performed by the execution of software embodied in one or more of the components/modules of system 102 illustrated in FIG. 1. At processing block 402, the method 400 receives information describing a collection. Information may include, for example, a textual description of the desired collection. The textual description may, in some embodiments, be delimited, such as by commas, semicolons, or other identifiable characters that can be used to separate portions of the textual description into coherent segments.

At processing block 404, the information is parsed and classified. In an embodiment, the classification module 146 (FIG. 1) uses one or more techniques to parse and classify the information. For example, parsing may be performed by strictly using one or more known delimiters. In an embodiment, parsing is performed by systematically grouping adjacent words in the textual description of the collection and performing one or more lookups in one or more data repositories for a known phrase. For example, if the textual description included "Topps baseball cards," by grouping "baseball" with "cards," the classification module 146 may determine that the phrase "baseball cards" is logically one phrase in the description and may present that as an initial classification (block 406, as described below).

At processing block 406, an initial classification is provided to a user of the server system 102 (FIG. 1). In an embodiment, the initial classification represents a first best guess of name-value pairs determined by the classification module 146. In an embodiment, the initial classification may use some or all of the words provided by the user in the textual description. In a further embodiment, the initial classification may reuse one or more words in various combinations and provide name-value pairings for each combination. For example, if the textual description included "Topps baseball cards," several name-value pairs may be generated by the classification module 146 and presented as an initial classification, such as "Manufacturer: Topps," "Product Type: baseball cards," and "Sport: baseball."

At processing block 408, a revised classification is received. In an embodiment, the user may be allowed to edit either the name, value or both after being presented the initial classification. For example, continuing with the example in the previous paragraph, if the initial classification determined a name value pair of "Sport: cards" using the textual description provided, a user may decide that this is an irrelevant or erroneous classification and may edit or remove the name-value pair.

At processing block 410, the revised classification is used by the server system 102 (FIG. 1) to determine if the collection already exists. In an embodiment, the server system 102 uses every name-value pair to determine if the collection already exists. In an alternative embodiment, if a threshold number of name-value pairs can be found in an existing collection, then the server system 102 may determine that the existing collection is related enough to be considered a match.

If at processing block 410 the collection is found to already exist, in full or in part, then at 412 the user is notified of the condition. In an embodiment, the user may be directed to the existing collection, such as by an HTML redirect or by providing the user a link to the existing collection.

If at processing block 410 the collection was not found in the server system 102, then at 414, the information describing the collection (e.g., name-value pairs) are stored in the server system 102, such as in the collection database 113.

Once a user creates a collection using various embodiments described herein, or if a collection already exists, then the user can create one or more collection entries. In an embodiment, collection entries represent objects that may exist in a collection (e.g., baseball cards, antique vases, coins) and may be described generically. Collection entries may be created by any user of the network-based commerce system 100 (FIG. 1) in various embodiments. In other embodiments, stored collection entries may be edited by one or more users of the network-based commerce system 100. Users may be restricted from editing some or all of a collection entry based on, for example, a user's rating, experience, privilege level, account status, or the like.

Figure 5:
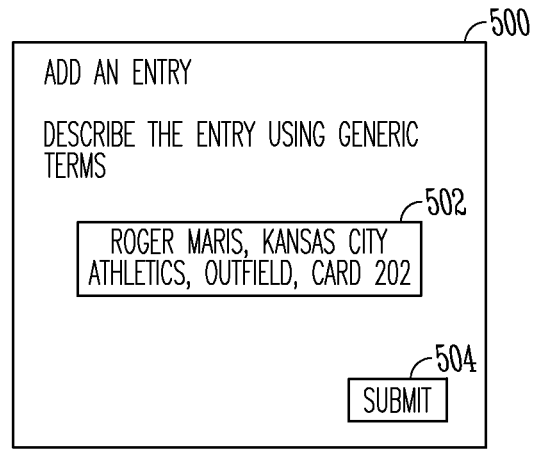
FIG. 5 is a collection entry creation page, in accordance with an example embodiment.

FIG. 5 is a collection entry creation page 500, in accordance with an example embodiment. Similar to a collection creation page 200 (FIG. 2, described above), the collection entry page 500 allows a user to create a new collection entry in a collection. The collection entry creation page 500 includes, in an embodiment, a text input 502 and a submission control 504. Using the text input 502, a user describes the collection entry to create and then submits the information using the submission control 504.

Figure 6:
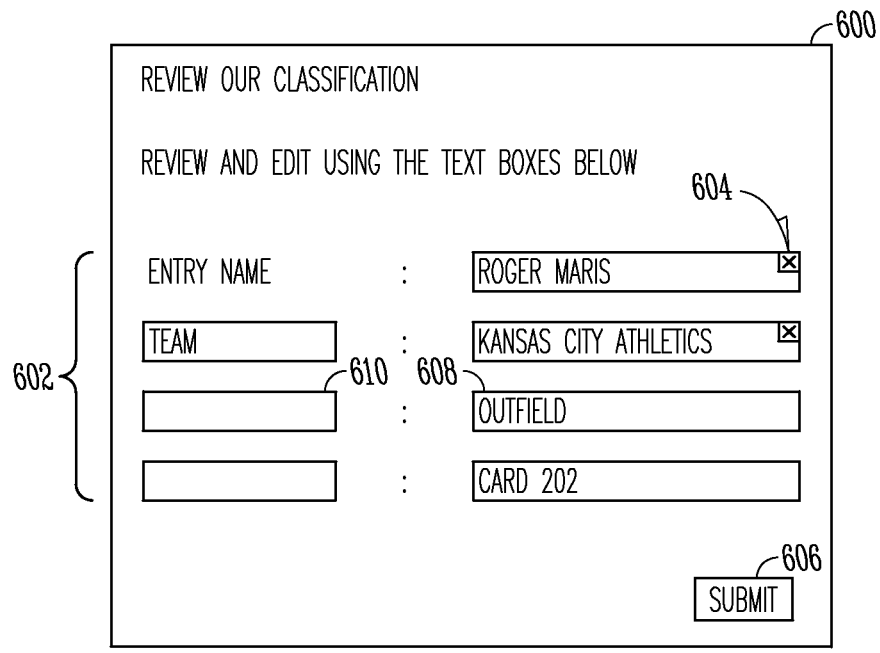
FIG. 6 is a collection entry classification review page, in accordance with an example embodiment.

FIG. 6 is a collection entry classification review page 600, in accordance with an example embodiment. Similar to the collection classification review page 300 (FIG. 3, described above), the collection entry classification review page 600 includes, in an embodiment, one or more initial classifications 602. In an embodiment, the initial classifications 602 are described using name-value pairs. The user may edit classification data, such as by editing in the text in the input control. For example, if the classification module 146 (FIG. 1) is unable to determine a proper name-value pairing, the name portion may be left blank. The user may then provide a name to describe the associated value. As shown in FIG. 6, item 608 has the value "Outfield" and does not have a corresponding name 610. In such a case, the user may provide an appropriate label, such as "Position." The user may also remove irrelevant or misclassified name-value pairs, such as by clicking on the "x" 604. After the user is satisfied with the accuracy of the classification, the classification is submitted using a submission control 606. In an embodiment, upon submission the server system 102 (FIG. 1) may verify that the collection entry has not already been created by another user. In the case that the submitted collection entry is likely a duplicate, the server system 102 may provide an alert or error notification. In such a case, the submitted collection entry information is abandoned and the user may be directed to the pre-existing collection entry.

Figure 7:
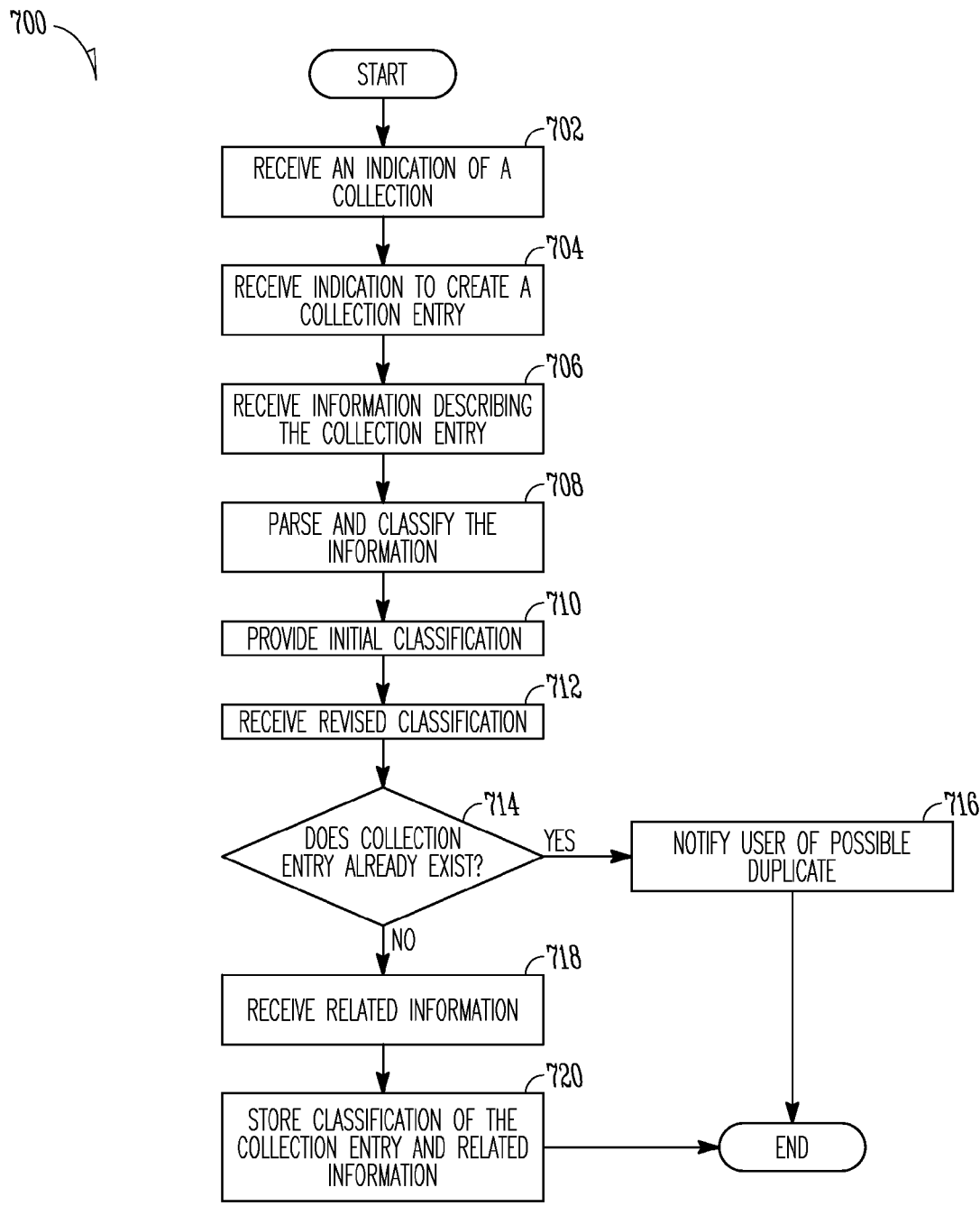
FIG. 7 is a flowchart illustrating a method of creating an entry in a collection, in accordance with an example embodiment.

FIG. 7 is a flowchart illustrating a method 700 of creating an entry in a collection, in accordance with an example embodiment. At 702, the method 700 receives an indication identifying an existing collection. In an embodiment, the indication is information stored as the user browses the collection, such as in a cookie or other persistent session variable. In an embodiment, the indication may be provided using a control, such as a drop down list, which is presented to the user on the collection entry creation page 500 (FIG. 5).

At 704, an indication that the user wants to create a collection entry is received. In an embodiment, the user is provided with one or more controls and/or prompts (e.g., a "Create Collection Entry" button or link) that enable the user to indicate a desire to create the collection entry. After the user indicates the desire to create a collection entry, a collection entry creation page 500 may be provided.

At 706, information describing a collection entry is received. Information may include, for example, a textual description of the desired collection entry. The textual description may, in some embodiments, be delimited, such as by commas, semicolons, or other identifiable characters that can be used to separate portions of the textual description into coherent segments.

At 708 the information is parsed and classified. In an embodiment, the classification module 146 (FIG. 1) uses one or more techniques to parse and classify the information. For example, parsing may be performed by strictly using one or more known delimiters. In an embodiment, parsing is performed by systematically grouping adjacent words in the textual description of the collection and performing one or more lookups in one or more data repositories for a known phrase.

At 710, an initial classification is provided to a user of the server system 102 (FIG. 1). In an embodiment, the initial classification represents a first best guess of name-value pairs determined by the classification module 146. In an embodiment, the initial classification may use some or all of the words provided by the user in the textual description. In a further embodiment, the initial classification may reuse one or more words in various combinations and provide name-value pairings for each combination.

At 712, a revised classification is received. In an embodiment, the user may be allowed to edit either the name, value or both after being presented the initial classification.

At 714, the revised classification is used by the server system 102 (FIG. 1) to determine if the collection entry already exists. In an embodiment, the server system 102 uses every name-value pair to determine if the collection entry already exists. In an alternative embodiment, if a threshold number of name-value pairs can be found in an existing collection entry, then the server system 102 may determine that the existing collection entry is related enough to be considered a match.

If at 714 the collection entry is found to already exist, in full or in part, then at 716, the user is notified of the condition. In an embodiment, the user may be directed to the existing collection entry, such as by an HTML redirect or by providing the user a link to the existing collection.

If at 714 the collection was not found in the server system 102, then at 718, any additional information describing the collection entry is received (e.g., a photo, general description, general history).

At 720, the information describing the collection (e.g., name-value pairs) and any additional information is stored in the server system 102, such as in the collection entry database 114.

A user may have an opportunity to edit a collection or a collection entry. For example, a user who has accessed a particular collection entry (e.g., via browsing or searching) can be given an opportunity to edit the catalog entry, in an embodiment. In embodiments, one or more rules defining a user's permissions or level of access are used to determine if or when a user may edit a collection or collection entry.

Figure 8:
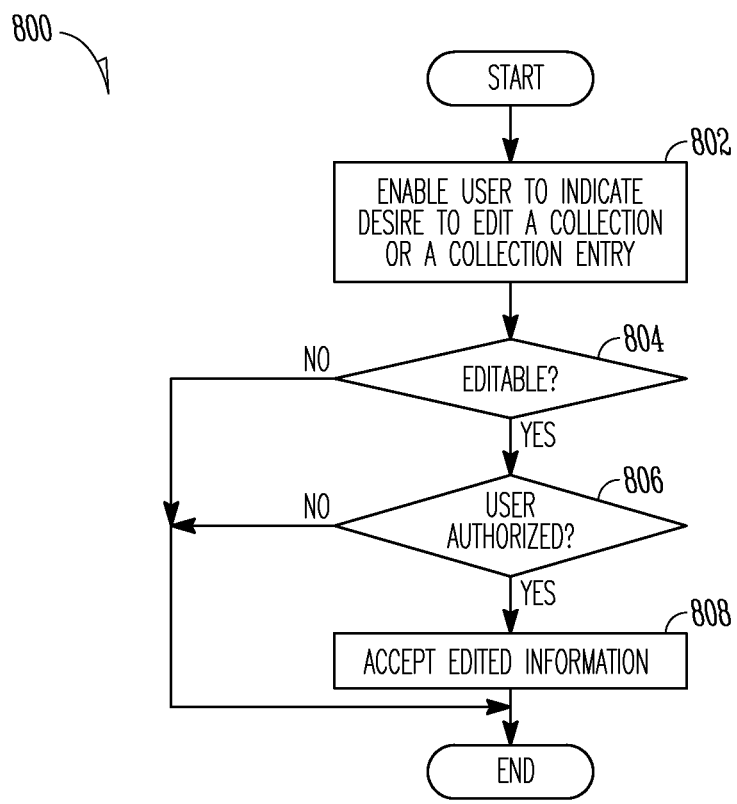
FIG. 8 illustrates a flowchart of a method for editing a collection or a collection entry, in accordance with example embodiments.

FIG. 8 illustrates a flowchart of a method 800 for editing a collection or a collection entry, in accordance with example embodiments. The method 800 begins, in block 802 by the system providing one or more prompts that enable a user to indicate that the user would like to edit a catalog entry. For example, a collection entry page (CEP) can include a page element (e.g., an "Edit Entry?" button), which the user can select to indicate a desire to edit the entry.

When a user has indicated a desire to edit the collection or collection entry, then at 804, a determination may be made whether the collection or collection entry is editable. In an embodiment, all collections and collection entries may be edited by users. In another embodiment, one or more collections or collection entries may not be editable. Accordingly, in an embodiment, a system includes a database of collections (e.g., collection database 112 in FIG. 1) in which some collections are editable by users and other collections are not editable by users. In a further embodiment, a system includes a database of collection entries (e.g., collection entry database 113 in FIG. 1) in which some collection entries are editable by users and other collection entries are not editable by users.

In an embodiment, any portion of a collection or collection entry is editable. In another embodiment, selected portions of a collection or collection entry are specified as editable, while other portions are locked as read-only. As an example, licensed content can be designated as being read-only, while user-contributed content may be designated as being editable.

In one embodiment, the determination of whether a collection or collection entry is editable is based on an identity of the contributor and an identity of those with editing rights. For example, in one configuration, any user can contribute content and any user can edit content. In another configuration, the contributor is the only person with editing rights to the content.

If an entry is editable, then at 806, the system determines whether the user has authority to edit the entry. One or more criteria can be used, in various embodiments, to determine whether a user has authority to edit the entry. For example, if the user is registered with the system (e.g., a registered eBay buyer or seller), then access can be granted. As another example, a determination can be made, prior to allowing a catalog entry to be edited, whether the user has appropriate criteria (e.g., appropriate permissions, minimum feedback score, no prior history of misconduct (e.g., vandalism of the catalog, etc.).

If the user has authority to edit the entry, then at 808, the system accepts the edited information and a new version of the collection or collection entry is saved in the appropriate database. In an embodiment, the system can maintain one or more prior versions of a collection or collection entry. An administrator and/or a user can, in certain circumstances, be able to revert back to a prior version, if desired.

In an embodiment, a user can choose not to edit a catalog entry directly or may not have the necessary privileges to do so. In this case, a feedback mechanism can be used to notify another party (e.g., a content owner) of the user's desire to change the content of a collection or collection entry. For example, a user may determine that a model number or description on a collection entry is incorrect, but because the collection entry is controlled by a manufacturer, the user does not have the ability to change the content. The user can then contact the content owner using methods such as a web form programmed in HTML or an email link. The content of the web form or email message can then be automatically forwarded to the content owner. In an embodiment, after the content owner addresses the issue raised by the user, the user is automatically notified of the resulting content change. For example, the user receives an email message from a "change tracking system" after the content owner has updated the content.

The feedback mechanism can also be used to allow users to acclimate to a user-editable catalog system. For example, initially, users may be hesitant to make changes to a product detail page, even though they could. However, the user may feel comfortable providing feedback via a web-based form. In an example, an email is generated and sent to the user encouraging the user to edit the page directly and explaining the purpose and goals of a community-controlled catalog system.

Various embodiments may provide systems and methods for which commercial content (e.g., collection entries) may be edited by a community of users who may or may not be affiliated with the provider of the commercial content. Various embodiments may provide systems and methods for generating, storing, and/or providing to users collection entries within a database of collection entries (e.g., collection entry database 113 in FIG. 1) that includes a subset of licensed catalog content and a subset of user-editable and unlicensed catalog content.

In an embodiment, one or more checkpoints are built into the system 100, which analyze content before or after a collection or collection entry is created or edited. For example, a checkpoint can comprise of an information display, such as information provided to a user regarding issues such as copyright policies, appropriate content, and dispute resolution. In a further example, a checkpoint can be implemented as a program or an application that automatically ensures that content is appropriate. For example, a checkpoint program can use a "bad word" filter or a database of known copyrighted or trademarked phrases to censor submitted content.

While some users may take advantage the functions to create or edit collections or collection entries, other users may merely wish to participate in the collections. Participation may take several forms including providing details about specific instances of a collection entry, providing purchase or sale history data, or indicating a desire to sell or purchase a specific instance.

Figure 9:
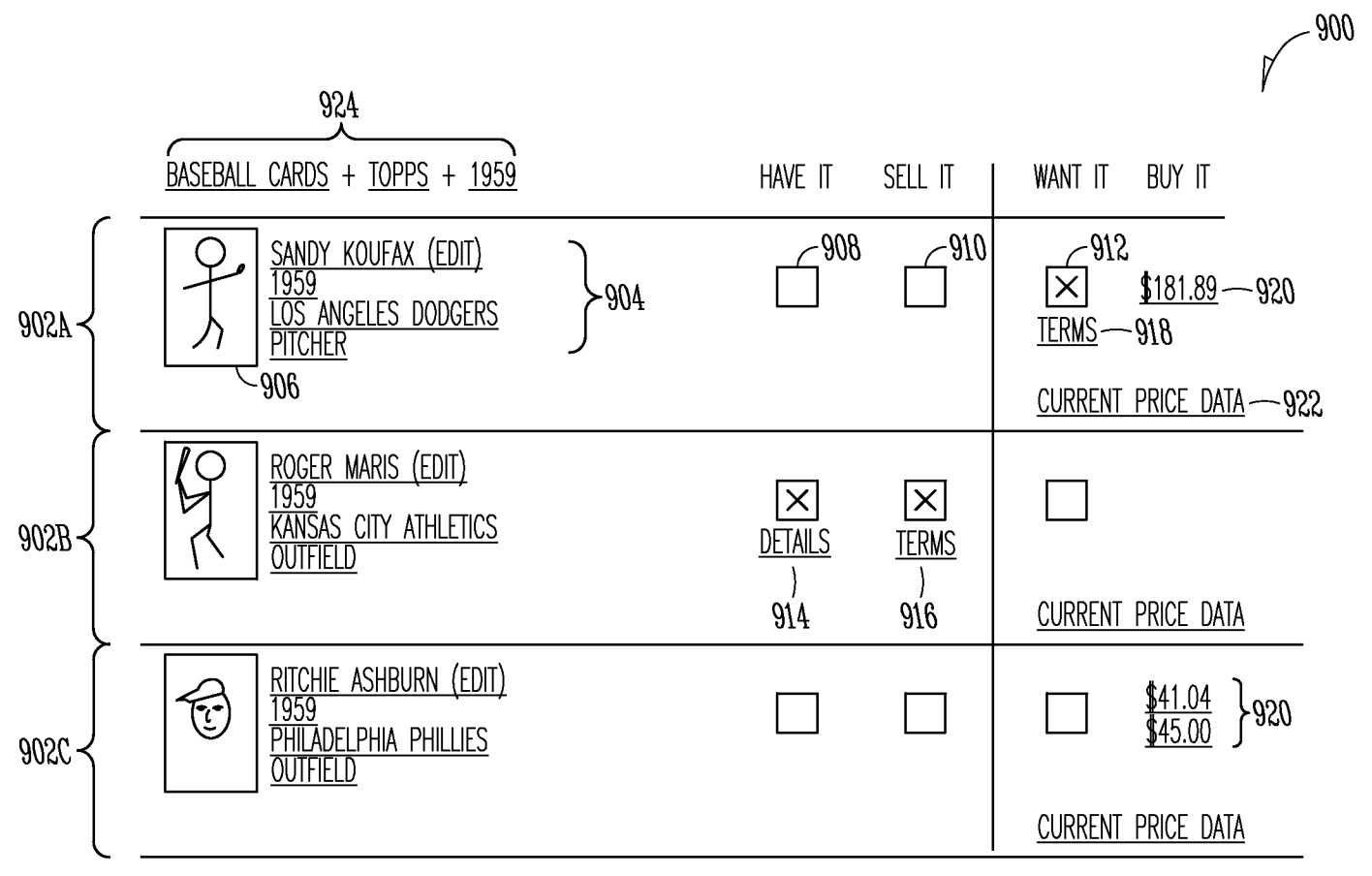

FIG. 9 is a collection browse page 900, in accordance with an example embodiment. The collection browse page 900 includes, in an embodiment, one or more collection entries 902A, 902B, 902C, where each collection entry may include a description 904, a related image 906, and controls (e.g., checkboxes) to indicate whether the browsing user has the collectible item 908, if so, if the user is willing to sell it 910, and whether the browsing user wants to buy the collectible item 912. In addition, in embodiments, some or all of the information displayed related to a collection entry is presented as a link. In FIG. 9, the collection browse page 900 includes links for each classified datum, such as the player's name, the year, the player's team, and the player's position. In addition, if a browsing user has a specific instance of the collection entry, the user may provide details, such as the condition, which may be accessible via a details link 914. If the user is willing to sell their specific instance of the collectible item, then terms of the sale may be accessible via a terms link 916. If the user is wishing to buy a specific instance of a collectible entry, then terms, such as what price the user is willing to pay for different grades of condition (e.g., mint, excellent, very good), may be accessible via a terms link 918. In an embodiment, if other users are willing to sell a specific instance of the collectible item, then one or more links 920 may be presented, where the links may indicate a price, a seller identity, condition, or other related information. To assist users in evaluating offers for sale, a current price data link 922 is available in some embodiments. By utilizing the current price data link 922, a user may be presented with price trends, actual sales data, or the like. A search trail 924 (e.g., a breadcrumb trail) is available in some embodiments.

Figure 10:
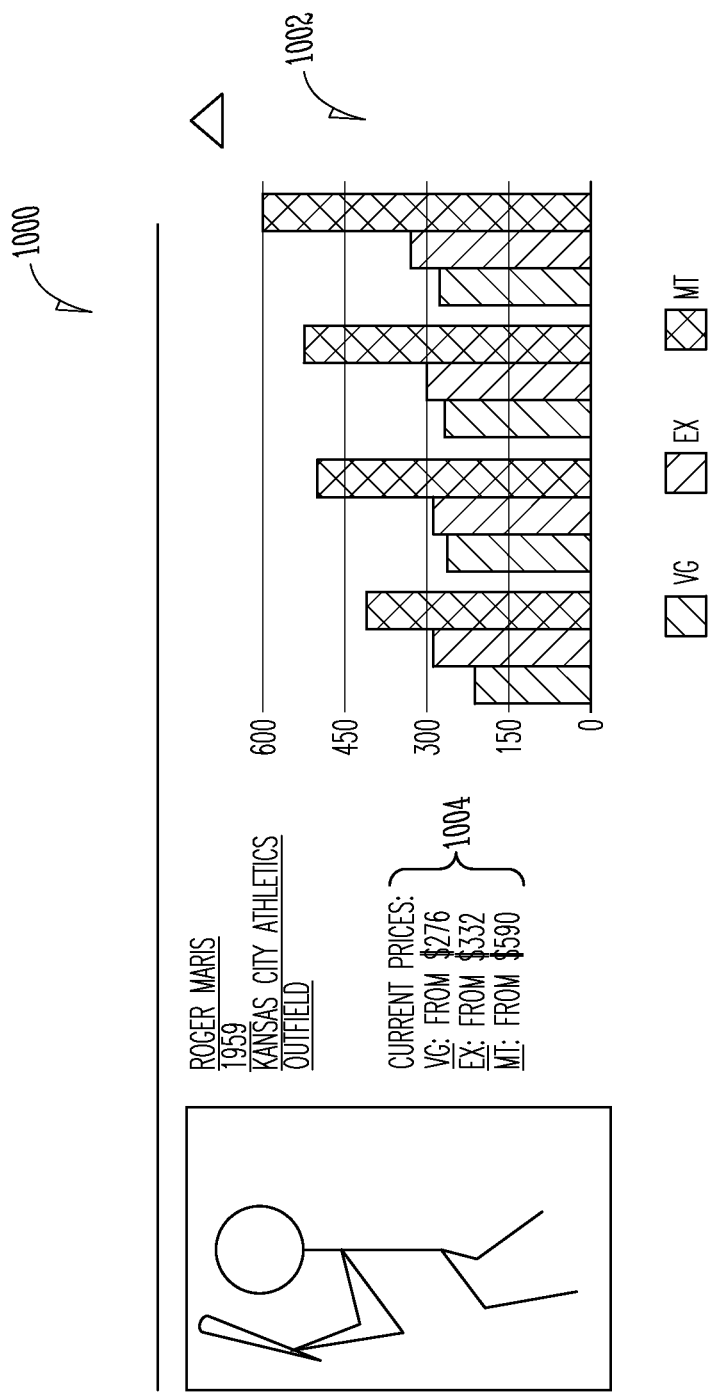
FIG. 10 is a current price page, in accordance with an example embodiment.

FIG. 10 is a current price page 1000, in accordance with an example embodiment. After following a current price data link 922 (FIG. 9), or by other means, a user may be presented with one or more representations of price data. In an embodiment, historical and projected price data is presented in a chart 1002, where the chart may, for example, show several conditions and the associated average, high, or low prices. In addition, current prices may be represented by a summary 1004 for ease of reference. Price data may be based on sales data tracked by the network-based commerce system 100. Price data may also be partially or fully based on external sources, including public databases, community input, or the like.

In various embodiments, a user is provided with one or more searching methods. In an embodiment, a user can drill down into a collection by adding additional constraints to restrict the listing of collection entries in a browse collection page. In an embodiment, a user can refocus using a descriptive term, as described in more detail below.

Figure 11:
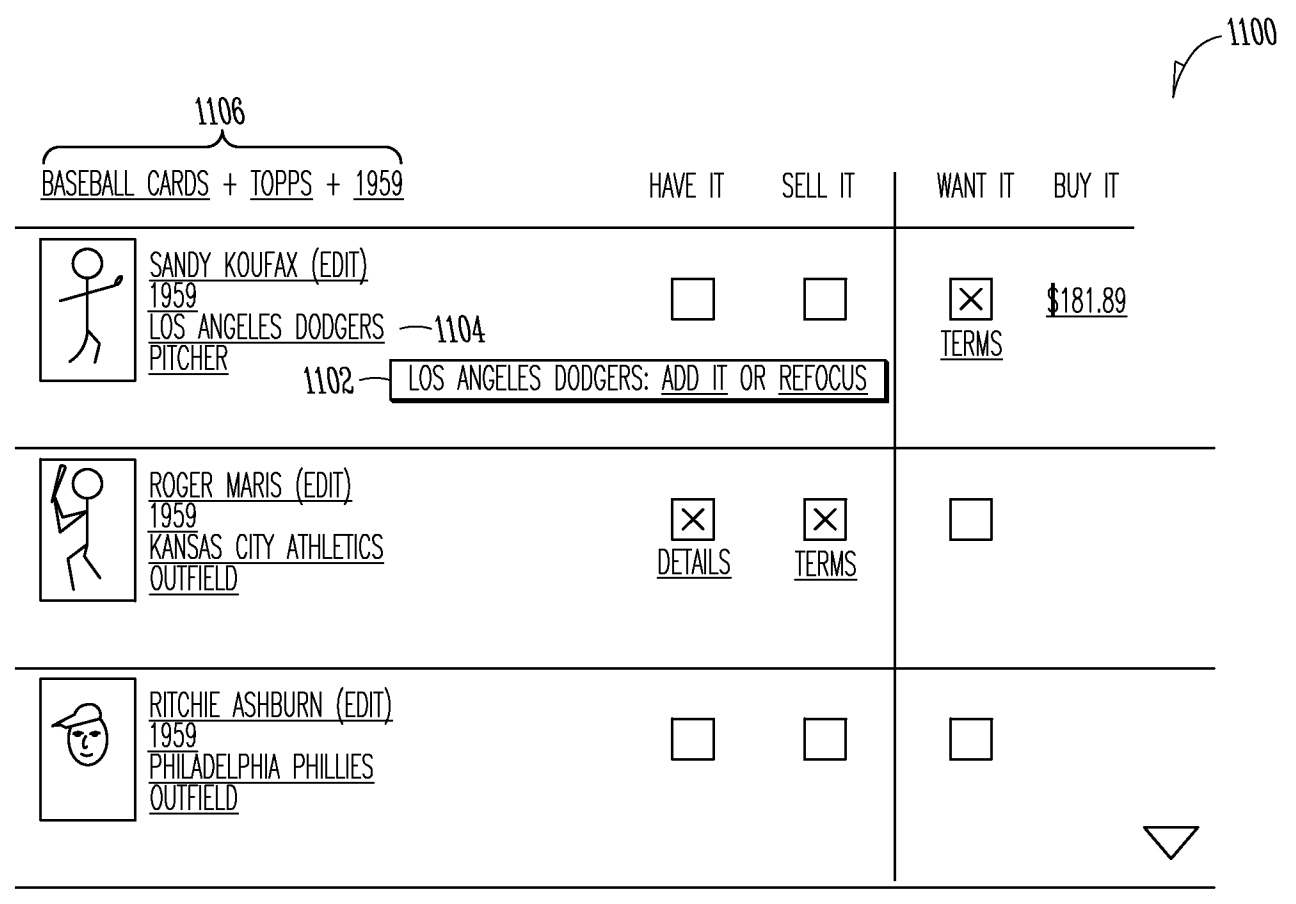

FIG. 11 is a browse collection page 1100, in accordance with an example embodiment. In FIG. 11, a user has activated a floating or pop-up display element 1102, such as by clicking or moving a cursor over a descriptive term 1104. In embodiment, the user is presented with two links, "add it," and "refocus" in the display element 1102. If a user selects the "add it" link, then the term is added to the current set of constraints and the list of collection entries is refreshed to display the appropriate filtered subset. In an embodiment, current search constraints are represented in a breadcrumb trail 1106, such as "Baseball Cards," "Topps," and "1959." By activating the "add it" link, the term "Los Angeles Dodgers" is added to the list of constraints in the breadcrumb trail 1106 and Topps baseball cards from 1959 of Los Angeles Dodgers players are displayed in the browse collection page 1100.

As an alternative, the user may choose to activate the "refocus" link in the display element 1102. The system 100 may provide the user a list of related terms, which may represent other collections or descriptive terms related to other collection entries.

FIG. 12 is a refocus page 1200, in accordance with an example embodiment. In an embodiment, the refocus terms are arranged in a "tag cloud." A tag cloud includes a graphical display showing related collections or terms. In one example, the refocus page 1200 includes a root term 1202 and one or more related collections 1204A, 1204B, 1204C, 1204D. In an embodiment, the related collections are implemented as links 1204A, 1204B, 1204C, 1204D and displayed in larger or smaller typeface depending on one or more factors, such as the number of collection entries in a collection or the relevance to the root term 1202. In an embodiment, clicking or activating a related term 1204A, 1204B, 1204C, 1204D will refocus the user's browsing based on the combination of the root term 1202 and a selected related term (e.g., 1204A, 1204B, 1204C, 1204D).

In another embodiment, upon activating a link of a related term 1204A, 1204B, 1204C, 1204D (e.g., clicking or moving a cursor over), the user may be presented with the option to either add the related term to root term 1202, as described above, or refocus using the related term as a new root term. In an embodiment, the controls (e.g., links) to either add or refocus using a related term is provided in a floating or pop-up display (similar to that in FIG. 11). If the user chooses to refocus using a related term (e.g., 1204A, 1204B, 1204C, 1204D), then the page 1200 is updated to show the new root term (e.g., the selected related term) and any related terms. A user may continue to browse laterally (e.g., sidestep) through an entire domain of collections using the refocus functionality.

Figure 13:
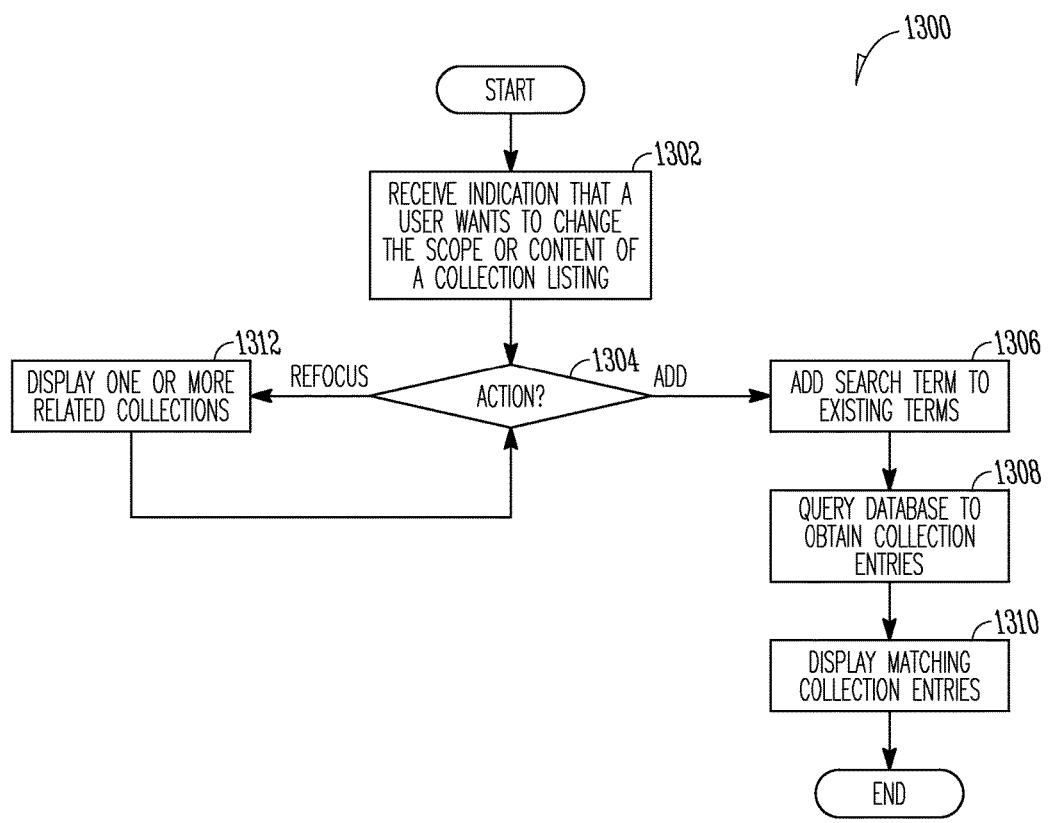
FIG. 13 is a flowchart illustrating a method of modifying a list of collection entries, in accordance with an example embodiment.

FIG. 13 is a flowchart illustrating a method 1300 of modifying a list of collection entries, in accordance with an example embodiment. At 1302, the method 1300 receives an indication that a user wants to change the scope or content of a listing of a collection. In an embodiment, the indication includes a pop-up display element containing one or more links or controls that allow the user to change modify a listing.

At 1304, the method 1300 determines if the user wants to add a search term or refocus using the search term. If the user chooses to add a search term, then at 1306 the term is added to one or more existing search terms. At 1308, the augmented set of search terms is used to query a database (e.g., a collection entry database 113 in FIG. 1) and determine zero or more related collection entries. At 1310, any matching collection entries are presented to the user.

If instead the user chooses to refocus using a search term, then at 1312 the user is displayed one or more collections related to the search term. In an embodiment, the related collections are presented with varying typefaces to indicate at least one of a relevance to the search term or a degree of coverage in the related collection. In a further embodiment, the related collections are presented as links.

In some embodiments, a link may be available (e.g., in a pop-up or floating display element) allowing the user to drill down into a collection and navigate to a new page showing collection entries related to the search term as limited by the selected related collection. In other embodiments, a link may be available allowing the user to refocus the search and navigate to a new page showing collections related to the selected collection, thereby using the selected collection as a starting point. A user may continue to refocus and move laterally through an entire domain of collections, until at some point the user decides to focus on a collection filtered by one or more current search terms.

Figure 14:
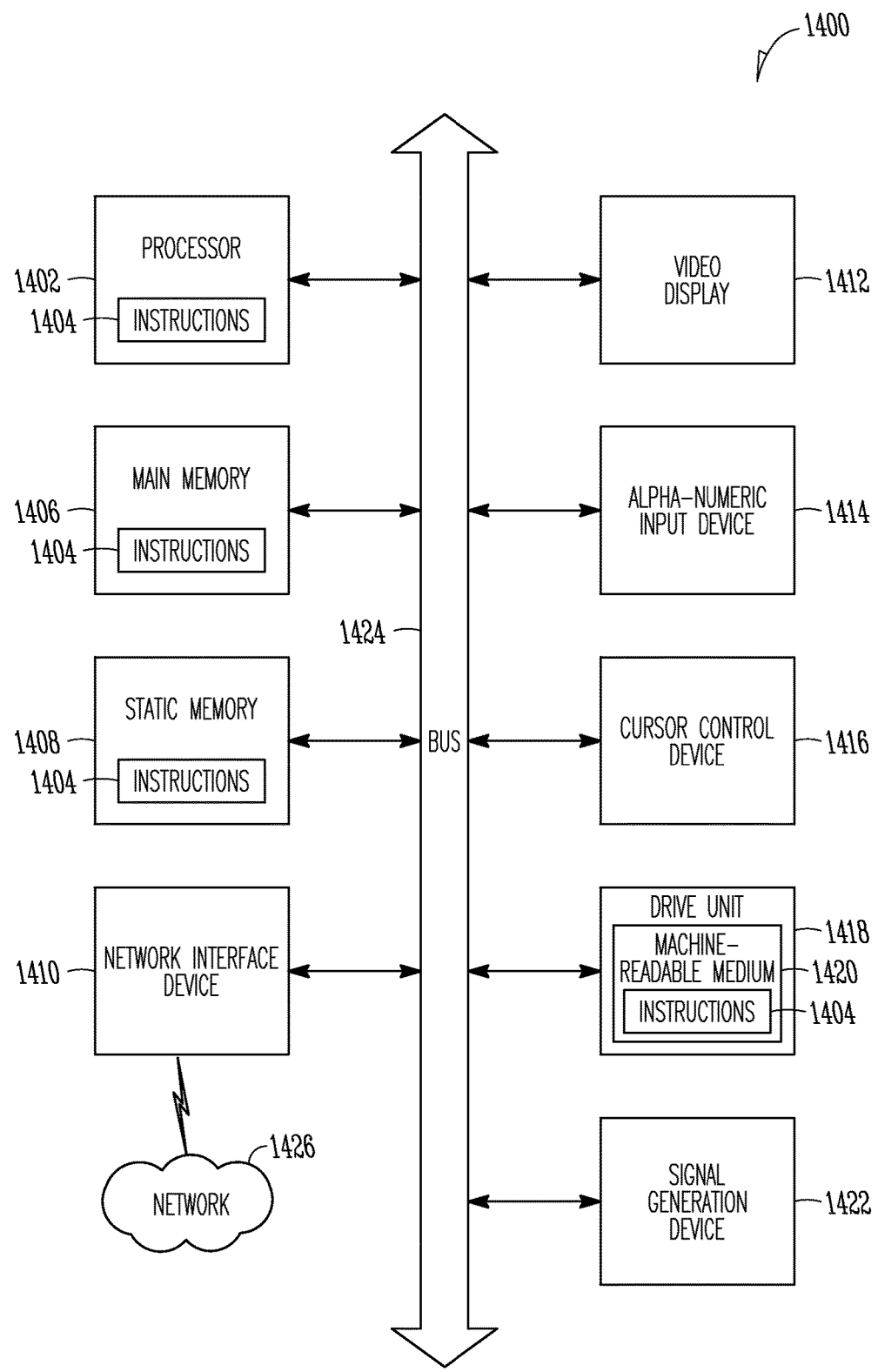
FIG. 14 illustrates a diagrammatic representation of a machine in the exemplary form of a computer system, within which a set or sequence of instructions for causing the machine to perform any one of the methodologies discussed herein may be executed.

FIG. 14 illustrates a diagrammatic representation of a machine in the exemplary form of a computer system 1400 within which a set or sequence of instructions, for causing the machine to automatically perform any one of the methodologies discussed herein, may be executed. In alternative embodiments, the machine may comprise a computer, a network router, a network switch, a network bridge, Personal Digital Assistant (PDA), a cellular telephone, a web appliance, set-top box (STB) or any machine capable of executing a sequence of electronically-coded instructions that specify actions to be taken by that machine.

The computer system 1400 includes a processor 1402, a main memory 1406 and a static memory 1408, which communicate with each other via a bus 1424. The computer system 1400 may further include a video display unit 1412 (e.g., a liquid crystal display (LCD) or a cathode ray tube (CRT)). The computer system 1400 also includes an alphanumeric input device 1414 (e.g., a keyboard), a cursor control device 1416 (e. g., a mouse), a disk drive unit 1418, a signal generation device 1422 (e.g., a speaker) and a network interface device 1410 to interface the computer system to a network 1426.

The disk drive unit 1418 includes a machine-readable medium 1420 on which is stored a set of electronically-coded instructions or software 1404 embodying any one, or all, of the methodologies described herein. The software 1404 is also shown to reside, completely or at least partially, within the main memory 1406 and/or within the processor 1402. The software 1404 may further be transmitted or received via the network interface device 1410. For the purposes of this specification, the term "machine-readable medium" shall be taken to include any medium which is capable of storing or encoding a sequence of instructions for execution by the machine and that cause the machine to perform any one of the methodologies of the inventive subject matter. The term "machine-readable medium" shall accordingly be taken to include, but not be limited to, solid-state memories, optical and magnetic disks, and carrier wave signals. Further, while the software 1404 is shown in FIG. 14 to reside within a single device, it will be appreciated that the software could be distributed across multiple machines or storage media, which may include the machine-readable medium.

The foregoing description of specific embodiments reveals the general nature of the inventive subject matter sufficiently that others can, by applying current knowledge, readily modify and/or adapt the disclosed subject matter for various applications without departing from the generic concept. Therefore, such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMS), read only memories (ROMs), and the like.

In the foregoing description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter, and it is to be understood that other embodiments may be utilized, and that process or mechanical changes may be made, without departing from the scope of the inventive subject matter.

Embodiments of the inventive subject matter may be referred to, individually and/or collectively, herein by the term "inventive subject matter" merely for convenience and without intending to voluntarily limit the scope of this application to any single inventive subject matter or inventive concept if more than one is, in fact, disclosed. It will be recognized that the methods of various embodiments can be combined in practice, either concurrently or in succession. Various permutations and combinations may be readily apparent to those skilled in the art.

What is claimed is:

1. A system comprising:
   one or more modules comprising one or more hardware processors and configured to:
   receive a textual description of an entry representing a collectible item, the entry being requested for creation within a collection of entries representing collectible items at a network-based system, the textual description of the entry representing the collectible item being submitted by a user of the network-based system and received from a client device of the user by a server system within the network-based system, the entry, after creation, corresponding to a listing of the collectible item at the network-based system;
   generate a structured description of the entry based on the textual description of the entry, the structured description of the entry including a name-value pair derived from the textual description submitted by the user;
   determine that the entry is absent from the network-based system; and
   create the entry within the collection by storing the structured description of the entry in a database of the network-based system based on the determining that the entry is absent from the network-based system.

2. The system of claim 1, wherein the one or more modules are further configured to:
   provide the structured description to the client device for approval by the user that submitted the textual description of the entry; and receive a revised description of the entry from the client device, the revised description of the entry including a revised name-value pair edited by the user that submitted the textual description of the entry.

3. The system of claim 1, wherein generating of the structured description of the entry includes parsing the textual description based on a delimiter included in the textual description received from the client device.

4. The system of claim 3, wherein the parsing of the textual description includes:
grouping two or more words included in the textual description of the entry into a group, at least some of the two or more words being adjacent in the textual description; and
determining that the group of the two or more words forms a recognizable phrase, wherein the generating of the structured description uses the group of the two or more words as a recognizable phrase.

5. The system of claim 1, wherein the one or more modules are further configured to provide a user interface to the client device of the user, the user interface being configured to edit the structured description of the entry.

6. The system of claim 5, wherein the user interface is configured to edit at least one of a title of the entry, a description of an item referenced by the entry, and an image of the item referenced by the entry.

7. The system of claim 1, wherein the one or more modules are further configured to determine that at least a portion the structured description of the entry is editable.

8. The system of claim 1, wherein the one or more modules are further configured to determine that a further user is authorized to edit the structured description of the entry created within the collection.

9. The system of claim 1, wherein the one or more modules are further configured to store a provenance code that corresponds to an item referenced by the entry, the provenance code being associated with the entry and usable to track history information of the item referenced by the entry.

10. The system of claim 9, wherein the history information includes at least one of a transaction of the item, an owner of the item, or a price of the item.

11. A method comprising:
receiving a textual description of an entry representing a collectible item, the entry being requested for creation within a collection of entries representing collectible items at a network-based system, the textual description of the entry representing the collectible item being submitted by a user of the network-based system and received from a client device of the user by a server system within the network-based system, the entry, after creation, corresponding to a listing of the collectible item at the network-based system;
generating a structured description of the entry based on the textual description of the entry, the structured description of the entry including a name-value pair derived from the textual description submitted by the user, the generating of the structured description being performed by one or more hardware processors;
determining that the entry is absent from the network-based system; and
creating the entry within the collection by storing the structured description of the entry in a database of the network-based system based on the determining that the entry is absent from the network-based system.

12. The method of claim 11, further comprising:
providing the structured description to the client device for approval by the user that submitted the textual description of the entry; and
receiving a revised description of the entry from the client device, the revised description of the entry including a revised name-value pair edited by the user that submitted the textual description of the entry.

13. The method of claim 11, wherein the generating of the structured description of the entry includes parsing the textual description based on a delimiter included in the textual description received from the client device.

14. The method of claim 13, wherein the parsing of the textual description includes:
grouping two or more words included in the textual description of the entry into a group, at least some of the two or more words being adjacent in the textual description; and
determining that the group of the two or more words forms a recognizable phrase, wherein the generating of the structured description uses the group of the two or more words as a recognizable phrase.

15. The method of claim 11, further comprising:
providing a user interface to the client device of the user, the user interface being configured to edit the structured description of the entry.

16. The method of claim 15, wherein the user interface is configured to edit at least one of a title of the entry, a description of an item referenced by the entry, and an image of the item referenced by the entry.

17. The method of claim 11, further comprising:
determining that at least a portion the structured description of the entry is editable.

18. The method of claim 11, further comprising:
determining that a further user is authorized to edit the structured description of the entry created within the collection.

19. The method of claim 11, further comprising:
storing a provenance code that corresponds to an item referenced by the entry, the provenance code being associated with the entry and usable to track history information of the item referenced by the entry, the history information including at least one of a transaction of the item, an owner of the item, or a price of the item.

20. A non-transitory machine-readable medium comprising instructions that when executed by one or more hardware processors of a machine, cause the one or more hardware processors to perform operations comprising:
receiving a textual description of an entry representing a collectible item, the entry being requested for creation within a collection of entries representing collectible items at a network-based system, the textual description of the entry representing the collectible item being submitted by a user of the network-based system and received from a client device of the user by a server system within the network-based system, the entry, after creation, corresponding to a listing of the collectible item at the network-based system;
generating a structured description of the entry based on the textual description of the entry, the structured description of the entry including a name-value pair derived from the textual description submitted by the user;
determining that the entry is absent from the network-based system; and creating the entry within the collection by storing the structured description of the entry in a database of the network-based system based on the determining that the entry is absent from the network-based system.

* * * * *